United States Patent [19]
Calderon

[11] Patent Number: 6,158,369
[45] Date of Patent: Dec. 12, 2000

[54] TRANSONIC HYDROFIELD AND TRANSONIC HULL

[76] Inventor: Alberto Alvarez Calderon, 410 Fern Glen, La Jolla, Calif. 92037

[21] Appl. No.: 08/814,418

[22] Filed: Mar. 11, 1997

Related U.S. Application Data

[60] Provisional application No. 60/015,704, Mar. 13, 1996.

[51] Int. Cl.$^7$ .................................................. B63B 1/00
[52] U.S. Cl. ...................... 114/56.1; 114/63; 114/61.27; 114/61.29; 114/61.3
[58] Field of Search .................... 114/56, 61, 63, 114/271, 291, 56.1, 61.27, 61.29, 61.3, 61.31, 61.32; D12/300, 313, 314

[56] References Cited

U.S. PATENT DOCUMENTS

| | | | |
|---|---|---|---|
| 514,835 | 2/1894 | Mills | 114/56 |
| 688,672 | 12/1901 | Niemeyer | 114/63 |
| 4,915,048 | 4/1990 | Stanford | 114/56 |
| 5,129,343 | 7/1992 | Giles | 114/56 |
| 5,701,835 | 12/1997 | Borseth | 114/56 |

*Primary Examiner*—Ed Swinehart

[57] ABSTRACT

A transonic hydrofield TH has been established which defines the shape of a displacement transonic hull (TH). The hydrofield is characterized in not having curvatures such as shoulders, midbody, or rear quarter, with a deep draft forward and shallow draft aft. In consequence of TH's shape, surface wave-making sources typical of conventional displacement hulls are eliminated. The transonic hull TH corresponding to the hydrofield has substantially triangular waterplane in dynamic displacement conditions, maximum draft forward, and minimum draft aft, and planing lateral surfaces inclined at large angle are vertical to the waterplane.

24 Claims, 5 Drawing Sheets

FIG. 1 (PRIOR ART)
BERNOULLI CONTOUR SYSTEMS

FIG. 8a (PRIOR ART)
DESIGN WATERLINES FOR ABC SHIP

FIG. 8b (PRIOR ART)

FIG. 6 (PRIOR ART)
INTERFERENCE DIAGRAM FOR BOW
AND WAVE SYSTEM, NARROW BODY.

TRANSONIC HYDROFIELD AND TRANSONIC HULL

CROSS-REFERENCES TO RELATED APPLICATIONS

The present patent application corresponds to my Provisional Application for Transonic Hydrofield and Transonic Hull No. 60/015,704 of Mar. 13, 1996.

STATEMENT REGARDING FEDERALLY SPONSORED RESEARCH OR DEVELOPMENT

Not applicable.

REFERENCE TO A "MICROFICHE APPENDIX"

Not applicable

BACKGROUND OF THE INVENTION

1. Field of Invention

This invention pertains to hulls for ships, yachts, submersibles, seaplane hulls, and other water-borne vessels. More particularly, it pertains to new hydrodynamic structures, the Transonic Hydrofield (TH), which intrinsically shapes a new type of displacement form, the Transonic Hull (TH). Together, TH and TH are characterized in substantially eliminating wave-making drag of displacement hulls, without incurring the drag penalties of planing hulls.

2. Description of Related Art

The potential of this writer's hull invention can be better appreciated by first reviewing the advantage and limitations of conventional hulls.

2.1 Displacement Hulls. Displacement hulls sustain boat weight by buoyant lift. As designed in the past and present, they have an upper speed limit called "hull spaced," above which hydrodynamic resistance (drag) grows at a high exponential rate. "Hull speed" varies inversely with on the square root of waterline length. Displacement hulls arc very efficient well below hull speeds, having a weight-to-drag efficiency ratio of the order of 80. At very low speeds (creep), the efficiency ratio increases to much higher values, because drag approaches zero but weight remains constant. However, near or above hull speed, their weight-to-drag ratio becomes physically and economically unacceptable. Therefore, greater speed of displacement hulls is attainable principally by increasing hull length. However, the advantage of length is not large. For example, the hull speed of a 50 foot hull is 9.5 knots, but for 300 foot hull speed, it is only 23 knots.

The hull speed limit in intrinsic of displacement hulls, because of their wave generation properties as they translate in the water, i.e., "wave making," which becomes critical at hull speed, as will be reviewed later on. This is a very serious problem in the economics of maritime transportation. For that reason, considerable research has been done in various ways to overcome it, unfortunately with only minor improvements. For example, a bulbous bow may slightly decrease drag at certain speed. Also, long slender hulls are less sensitive than beamy hulls, but carry less cargo, and have other problems, as will be reviewed later on.

Accordingly, there remains an urgent need for improving the speed range and high speed efficiency of displacement hulls. A practical solution of this problem is needed, especially if it is able to eliminate wave-making drag without recourse to hydrodynamic planing.

2.2 Planing Hull. There is a widely held view that the planing hulls, in which weight is supported principally by a hydrodynamic lift force from momentum change (as distinct from buoyant lift), can overcome the speed limits of displacement hulls, and furthermore that they are efficient at high speed. Actually, while planing permits high boat speed, it does so only for boats with an approximately flat underbody having relatively light weight and equipped with large propulsive thrust. But the fact remains that planing is a grossly inefficient hydrodynamic regime, since the best ratio of boat weight to resistance is only about 8. This is less than half that of a modern jet transport flying about 10 times faster, and only ⅒th that of a displacement hull of "reasonable" length near, but below, hull speed. The limitations of planing are inherent in their generation of lift by angle of attack, described mathematically with equations which are analogous to those of supersonic flight, as will be reviewed later on for the limiting case of inviscid planing.

2.3 Semi-Planing Hulls. Unlike displacement hulls which have upwardly curved sterns and curvatures at the bow, causing their CG to sink with forward speed (increasing their apparent weight), and unlike planing hulls having flat undersurfaces and a CG which tends to rise with forward speed, the semi-planing hull usually has a Vee bottom and, for practical reasons, is heavier than a pure planing hull. Although the semi-planing hulls can generate the appearance of a "flat" wake at high speeds, their lift is generated by a combination of buoyancy and dynamic forces, which is very inefficient. The borders of their "flat" wakes, as seen from an aerial view, join together at some distance behind the stern, generating a trailing "hollow" on the water's surface, which can be interpreted, from the viewpoint of a fish trained in hydrodynamics, as an virtual displacement hull of larger length than the waterplane of the semi-planing hull. The semi-planing hull is an inefficient hybrid at slow speeds, it has excessive drag compared to a displacement hull. It requires very large power to reach semi-planing speed, at which regime it is less efficient than a pure planing hull. On the other hand, a semi-planing hull provides smoother ride for a greater payload in a rough sea, and is probably more seaworthy than a planing hull. However, it has a rougher ride than a displacement hull, with less favorable sea keeping characteristics, and is commercially not viable for most maritime applications.

2.4 Semi-Displacement Hulls. As length-to-beam ratio is increased in slender hulls, wave-making drag decreases. According to Saunders, slender displacement power boats were common in the 1910s. Later on, the German Schnell boote (fast boat), having a round-bottom hull, was successfully developed as an S-boat for WWII, performing well at high speeds in the rough North seas. However, as the length-beam slenderness ratio of semi-displacement boats is further increased, the lateral stability and payload capacity is further decreased. In the extreme, an 8-man rowing shell relies on oars for lateral stability. With a length-to-beam ratio of 30, its wave-making resistance is only 5% of the total at 10 knots, but its weight-to-drag ratio is only 20, approximately. An appropriate comparison in aircraft is the modern sailplane with a wing span-to-chord ratio of 25. It can operate at weight-to-drag ratio of 40, at 6times the speed.

In the limit as beam of slender hull approaches zero, wave-drag tends towards zero, but viscous drag subsists and payload capacity vanishes. Accordingly, recent development of high speed semi-displacement boats have proposed a mixed lift mode, using complex additions to the hull to generate hydrodynamic lift at higher speeds, in order to decrease buoyant lift component, and to compensate other shortcomings of the slender hull at high speeds, for example, lateral instability and a tendency for nose high attitude. As is the case for semi-planing hulls, their ratio of weight-to-drag is not very satisfactory, and in consequence, payload is not large. Although they appear to have performance advantages over semi-planing near hull speeds, and are less sensitive in pitch and their complex shapes appear to have an inherent size limit. It may be added that the proper name for this kind of vessel should be displacement-dynamic hull or quasi-displacement hull, rather than semi-displacement.

2.5 Multi-Hulls. The wave-making and other drag problems of the various hull types reviewed above are so serious that considerable recent efforts have ben applied for the development of new multihulls. Although this field is outside the scope of this review, a few remarks are in order. A pair of very narrow slender displacement hulls of a Catamaran, widely spaced laterally for stability, have been successfully developed and are being used at high speed for various applications, especially in Asia. SWATHS are also multihulls which rely on totally submerged primary displacement for performance and smooth riding. These developments and other high speed hull developments (see, for example, Jane's high speed marine craft) have so far been restricted to special applications, highlighting the need for ship manufacturers to increase the speed and improve the riding qualities of displacement monohulls.

BRIEF SUMMARY OF THE INVENTION

FIGS. 1–11 illustrate Prior Art hulls and characteristics.

The TH is characterized in having engaged triangular waterplane shape in dynamic conditions, a triangular profile, or modified triangular profile in side view with maximum draft forward and minimum draft aft, planar lateral surfaces at large inclination or vertical to the water, a double-wedge volume distribution with a narrow entry angle in planning and a fine exit angle aft profile.

The hydrofield TH is characterized in absence of surface wave-making sources such as shoulder, midbody, or quarter curvatures; narrow entry forward which minimizes the water volume displaced per unit of time, and induces special underbody flow, favoring adherence to the vehicle's sides of new types of bow ray effects of very reduced size; absence of trough; favorable contracting streamline on the sides; favorable pressure gradients on the hull's lower surface; broad stem underflow prevent pitch up and eliminate stern wave, and favors the recovery of underbody energy as well as that from following seas. In the case of sailboats, special TH shapes permit long stern overhangs if required, or favored, by racing rules. TH also provides special hydrodynamic coverage of roots of appendages by the elimination of wave-making troughs.

BRIEF DESCRIPTION OF THE SEVERAL VIEWS OF THE DRAWING(S)

The transonic geometric shape TH is shown in FIGS. 12a, 12b, 14a and 14l. The transonic hydrofield TH is shown in FIGS. 13a, 13b, 13c, 15a, 15c, 14b, 14c, 14d, 14e, 14f, 14g, 14h, 14i, 14l, 14m and 16b. They are applicable to any type of waterborne vessel, or submersible vessel operating near or at surface, or hulls of seaplane.

DETAILED DESCRIPTION OF THE INVENTION

1. CONCEPTUAL INQUIRY LEADING TO THIS INVENTION

One critical objective of this writer's invention is to formulate the hydrodynamic design for a physical hull which is not susceptible to wave-making drag limits of conventional hull, or of planing hulls. His conceptual inquiry addresses the following fundamental questions:

Is "hull speed" a physical "law" applicable to all possible displacement hulls, or is it a statistical property of hulls as designed in the past and in current "state of the art"?

What are the ultimate hydrodynamic causes of wave making of displacement hulls?

What is the potential of very slender hulls to reduce wave-making drag with acceptable volume for payload?

What are the ultimate drag limits of planing hulls, for example in inviscid planing?

If one disregards all past hydrodynamic shapes and "laws", is there a practical displacement hull shape that does not generate wave-making phenomena of the type that currently limits speed and economic performance of conventional displacement ships, without incurring into the drag penalties of planing hulls?

2. ON THE PHYSICS OF WAVE-MAKING OF CONVENTIONAL HULLS & CERTAIN DISCOVERIES

Wave phenomenon in liquids and wave-making around ship forms are discussed at some length, and with adequate lucidity in Saunder's "Hydrodynamnics in Ship Design," written under the auspices of the U.S. Navy. Less extensive reviews are also available in Gutelle's "The Design of Sailing Yachts," Marchaj's "Aero-Hydrodynamics of Sailing" and "Sailing Theory and Practice"; in Todd's "The Fundamentals of Ship Form." The theoretical formulation of wave making is also reviewed in some depth by Kelvin, Stokes, Lamb, Durand, Innui, Wigley, Cummins, Reid, Calderon, Lunde and others.

Important descriptions of principal physical phenomena which cause wave-making by ships, taken from some of the references cited, are reviewed below.

Figure 1:
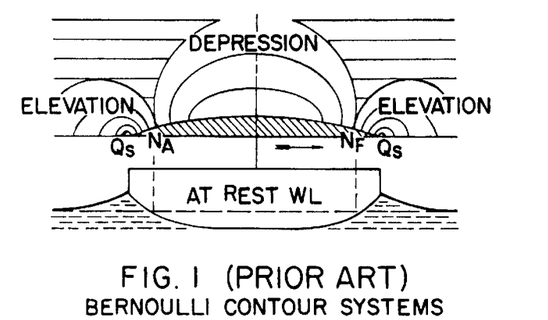

(a) The Bernoulli mathematical wave contour system around a simple ship form is shown in FIG. 1, after Durand and Saunders.

Figure 2:
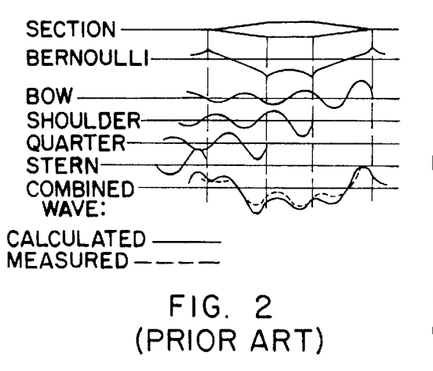

(b) A description of wave-making sources in terms of Bernoulli, bow, shoulder, quarter and stern wave components of a simple double wedge form are shown in FIG. 2, after Saunders and others, including resulting wave summation. The analytic advantage of this shape is that it has specified clearly the location at which wave components start. Also, it is similar to some theoretical airfoil shapes for supersonic analysis.

Figure 3:
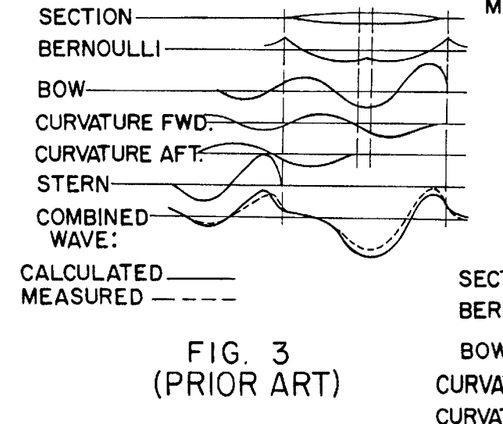

(c) Bernoulli, bow, forward curvature, aft curvature and stern wave components for a simple, slender, smooth lenticular airfoil shaped body are shown in FIG. 3, after Wigley's calculations in Todd, including resulting wave summation.

Figure 4:
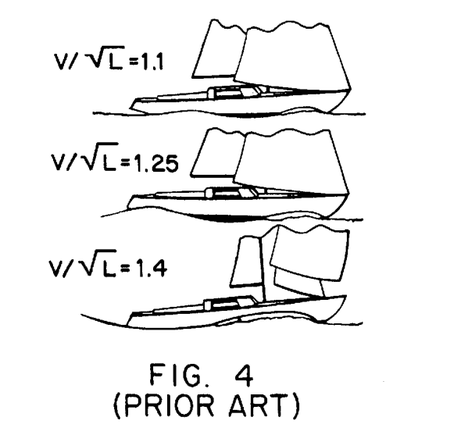

(d) The relation of a hull's wave-making on a boat's angle of attack (attitude) and therefore of part of its resistance are shown in FIG. 4 as function of speed-to-length ratio, after Marchaj and Gutelle, including typical wave-making profiles at the hull's sides.

Figure 5:
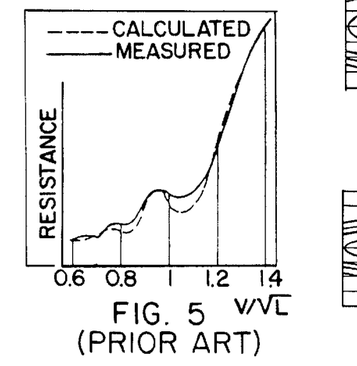

(e) The theoretical wave-making drag (resistance) of a hull is shown in FIG. 5 as function of Froude number, after Gutelle and others, simplified as speed-to-length ratio, so its drag effects comparing theory to physical reality such as sketched in FIG. 4 can be better understood.

Figure 6:
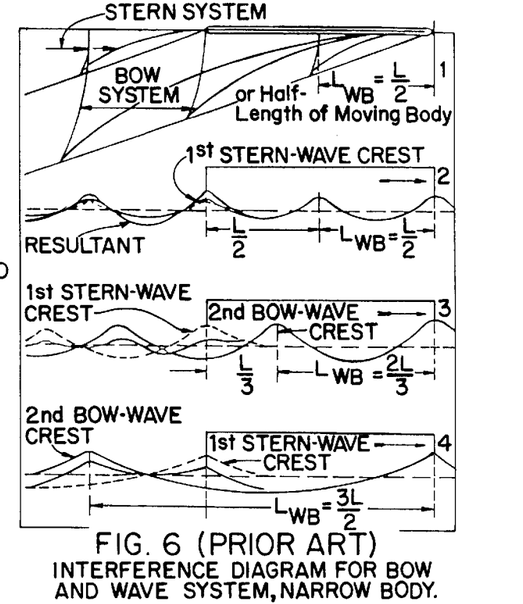

(f) Even an extremely narrow ship form such as may be used in the light displacement amas (pontoons) of a Catamaran or semi-displacement hulls, continue to generate wave-making drag, the theoretical aspects of which are described in FIG. 6, after Saunders. As the beam of these slenders is decreased, payload also decreases, so their practical utility is very restricted.

Figure 8A:
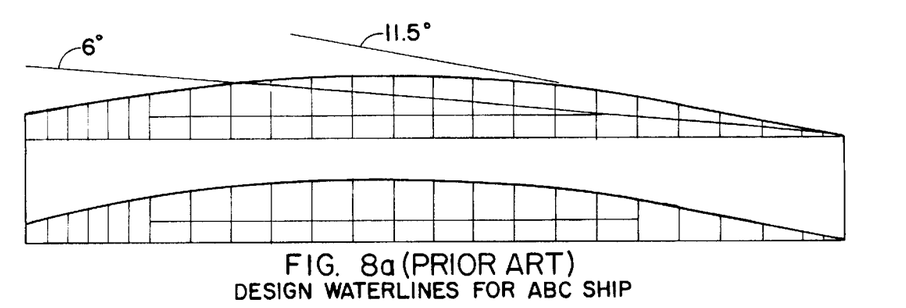
Figures 8B, 9A, 9B, 10A, 10B:
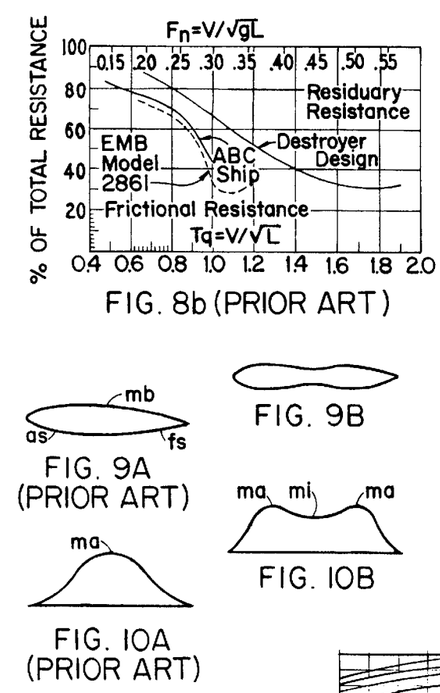

But hulls with a high payload, even with higher slenderness ratio of FIG. 8a, with a waterline-to-beam ratio of 8.2 after Saunders'ABC ship, continues to have a high percentage of wave-making (residual) drag, reaching 50% at speed-to-length ratio of only 1.0, as shown in FIG. 8b also after Sanders.

The latest, most advanced displacement monohull racing designs such as used in International America's Cup Class (IACC) boats have a very smooth profile and a length-to-beam ratio of about 4.5 to 1. Nevertheless, they continue to have an adverse "hull speed" limit due to wave-making, the origin of which is related to all of the wave-making components described in FIG. 3.

Figure 7A:
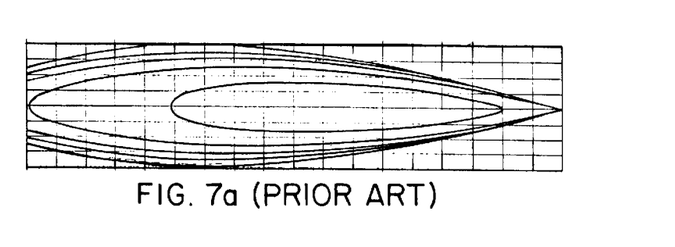
Figure 7B:
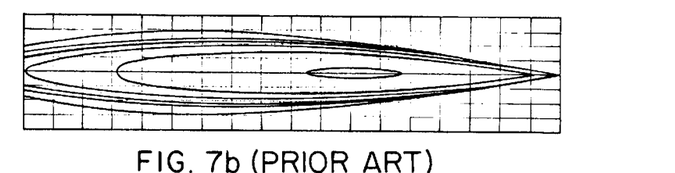

If a hull (canoe, no appendages) of this general type is optimized for less weight, such as is shown in FIG. 7(a) with a length-to-beam ratio of 4.5, and is then elongated in the computer, for example, to a length-to-beam ratio of 6.2 to 1 as in FIG. 7(b), a slender boat results which even a reduced weight continues to have wave-making components described in FIG. 3, but of less magnitude. Given sufficient thrust, such a hull could enter into a semi-planing regime, an unpromising situation, as will be reviewed later on.

Alternative attempts to reduce wave-making of displacement hulls with "area rule" principles borrowed from Dr. Whitcomb's aerodynamic transonic theory for fuselage design have had uncertain results in hulls, for example, in P. de Saix's searching efforts at Hoboken, described by Marchaj. It is conceivable that the slender shape of FIG. 3 could be altered to a "waisted" canoe shape, if Dr. Whitcomb's ideas applied to the water-air interface. One difficulty is that wave-making drag of ships of FIG. 3 is predominantly of gravitational origin, appearing at the interface of two fluids—water and air—having very different densities (ratio of 840:1), but constant atmospheric pressure. This is a boundary condition totally different from the three-dimensional flows of a transonic "area ruled" fuselages in which thermodynamic and pressure variations predominates. The results of de Saix's valuable efforts and similar work has not been successful.

Towards an explanation of the ultimate causes of wave-making resistance, this writer has reviewed above how the shape of hulls generate wave-making phenomena, and what effect this has on resistance of ships. As pant of his studies, however, some time ago this writer has made a first discovery that the smooth curves used in ship design such as waterplanes in FIG. 7a and 7b have inherently misleading characteristics in real physical flow. These types of smooth hull shapes have been used in displacement hulls from antiquity to present (Phoenician boats, Viking ships, commercial vessels, and navy vessels all had very smooth hull shapes). However, their waterplanes, for example, as in FIG. 8a, while geometrically real, are hydrodynamically divorced from reality. They exist only in hydrostatic conditions without forward motion. When forward motion occurs, the hydrostatic "fairlines" and "fairbodies" become significantly changed. When motion approaches hull speed, new "waterplanes" parallel to the undulated water surface must be considered: they become "unfair", resulting in a hydrodynamically distorted inflected body shape, compared to the hydrostatic water-plane.

For example, the hydrostatic (flat water) lenticular waterplane of FIG. 9a, which is fair and smooth, must be reconsidered, according to this writer's discovery, since at a speed-to-length ratio of about 1.3, it changes towards a "dumbbell" type of real dynamic "waterplane" shape parallel to the undulating water surface shown in FIG. 9b, which is evidently inflected and "unfair", obviously different in kind from FIG. 9a.

Also, the cross-sectional area curve distribution for FIG. 9a in hydrostatic (flat water) conditions, generates a classic "bell shaped" smooth area distribution of FIG. 10a with a single maximum point. This is changed by forward motion with a tendency for a double hump distribution of the type shown in FIG. 10b, towards two maximum points "ma" and a mid-body minimum point "mi": a "camel area curve shape" corresponding to the "dumbbell waterplane shape" of FIG. 9b, which may be now understood as a dumb shape as well, often governing the hydrodynamics of real ships, if not of swimming camels (because of their legs).

Due to the serious discrepancies between smooth hydrostatic waterplanes and those parallel to the water surface in hydrodynamic conditions, this writer does not grant priority nor, indeed, validity to current practice of ship design with hydrostatically faired curves such as FIG. 7 and 8, and as a second discovery regards observed speed "laws" such as hull speed limit, only as statistically valid test resulting from certain traditional design tendencies.

It is evident from the prior review, i.e., FIGS. 2 to 10b, that displacement hulls in motion generate an undulated water surface which modified the "faired" waterplanes which are used to calculate hydrostatic "displacement." The waves travel attached to the hull as shown in FIG. 4, and produce an energy-consuming wave train symptomatic of wave-making resistance of FIGS. 5 and 8b. Toward an explanation of the ultimate causes of wave-making drag of ships as design in the past, this writer now reviews the physics of the flow of such displacement hulls as they approach and attempt to overcome hull speed barrier.

Without forward motion, the boat weight is equal to buoyant lift "displaced" n by the hull position submerged relative to flat water in hydrostatic conditions; for example, FIGS. 7a and 8b.

AT moderate speeds, say speed-to-length ratio of 0.9 shown in FIG. 4, the wave-making of current displacement ship shapes produces an undulated surface having three crests traveling attached to the hull, with the crests above the remote waterplane. Evidently, the crest at midbody is particularly effective in generating added buoyant lift from the broad midbody compensating the deficiency of buoyant lift caused by the troughs of the wave system at the shoulders and quarters of the hull.

However, at a speed-to-length ratio of 1.25, as can be seen on FIG. 4, there is only one trough at mid-body of the hull, well below the remote waterplane. This sets certain physical buoyancy deficiencies reviewed below:

The midbody is unable to generate its large intended buoyant lift contribution, because the water surface adjacent to it is at a low level relative to the remote waterplane.

This deficiency of buoyant lift necessarily results in a significant sinkage of the hull, and of the bats center of gravity (for example, 0.75% of water-line length for a smooth displacement hull).

This sinkage includes a downward pressure force (suction) generated by the high speed flow under the curved undersurface of a conventional displacement hull, increasing the "apparent" weight of the boat.

As the mid-hull sinks, the bow and stern must also sink to generate added buoyant lift from the bow and stern volumes engaging the bow and stern waves, so that buoyant lift equal to weight.

The apparent density of the water at the bow and stern waves, however, must be modified on account of their orbital velocities, in order to determine the buoyant lift contribution at the bow and stern.

The additional engagement of displacement volume of bow and wave portions of the hull increases the height of bow and stern wave, which:

necessarily causes (by energy conservation) a corresponding increase in the depth of the midbody trough leading to:

a further sinking of the hull, and yet additional engagement and growth of bow and stern waves, and of midbody trough.

This vicious circle results in the "hull speed" limits of displacement hulls as designed in the past and present, and produces the very rapid increase of hydrodynamic wave-making drag (residual resistance) with speed, as was shown in FIGS. 5 and 8b.

The resistance problem is further aggravated if a displacement hull, as designed in past or present state of the art, attempts to exceed hull speed, for example by use of a large amount of engine power, or gravitational energy when a sailboat begins "surfing" in the inclined plane of an ocean wave: as the speed-to-length ratio increases above 1.3 (speed in knots, divided by the square root of length in feet), the stern of the boat sinks in the trough of the wave-making system, changing the angle of attack of the hull to a nose-up attitude shown in FIG. 4 at speed-to-length ratio of 1.4, which can be recognized as a condition leading towards "planing", provided the relation between thrust, weight and shape is adequate. If planing were an efficient hydrodynamic regime, this might be considered a desirable solution for "hull speed" limit. Whether this is the case or not will be reviewed in the next section.

3. ON THE PHYSICS OF PLANING HULLS & EFFICIENCY LIMITS OF INVISCID PLANING

A design approach intended to eliminate wave-making of displacement boats is to shape the hull and select the weight, speed and power to produce a so-called "planing" regime, which incidentally is seldom defined with precision.

Although all designers recognize that at slow speeds "planing hulls" do not plane and generate very large drag, some believe that once planing speed is reached, the planing regime is efficient, and may even believe that drag decreases with speed, once planing begins. These beliefs probably originate in the physical sensation that the rate of growth of drag with speed decreases once planing begins (second derivative of drag with speed negative being true), which is incorrectly interpreted as a decrease of drag force with speed (first derivative of drag with speed negative being incorrect). The fact is that tests of planing boats in their planing regime show drag increases with speed.

Although the planing of a boat hull is a very complex phenomenon, the fundamental physics of drag generation while planing can be understood in an analogy to supersonic flight. In the latter, the lift-to-drag ratio (equal to weight-to-drag ratio) is an efficiency index which for a thin flat airfoil is a function of angle of attack, in a totally different manner from the lift-to-drag ratio index of an airfoil in subsonic flight, The difference is due to the existence of a propulsive (suction) pressure force at the leading edge of a subsonic airfoil, which is not present in the supersonic case.

According to this a writers investigations, planing boats may not generate conventional wave-making drag inherent of displacement hulls. Instead, they necessarily generate, specifically in the planing mode, another type of high drag force, which is a function of angle of attack of planing, is inherent in planing, and is not present in a "pure" displacement hull. The function has the same mathematical form as the pressure drag of thin wings in supersonic flight.

Figures 11, 13A:
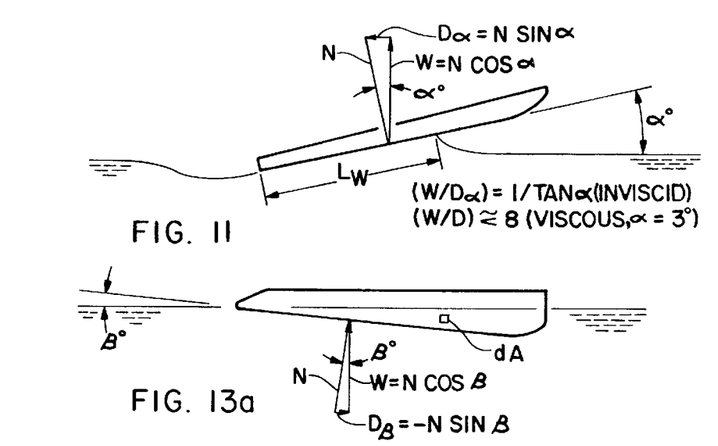

To elucidate the disastrous inevitability of this type of drag for planing hulls, consider in FIG. 11 the most efficient of planing hulls, namely, a flat plate having a weight W, planing in inviscid (best) flow with mass density of water, at an angle of attack alpha ( ). From Newton's second law, an angle of attack greater than zero is essential to generate dynamic (i.e., non-buoyant) lift to oppose and balance weight W. Moreover, by fundamental consideration of physics, the only force acting on the plate is a resultant pressure force N due to change of momentum of the inviscid flow under Newton's second law, such that:

The resultant force N is normal to the flat plate, since there is no viscosity, and In uniform motion, the weight W of the flat plate must be W=Ncos In consequence, there is a drag due to angle of attack D =N sin Accordingly, the efficiency ratio of weight-to-drag while planing in inviscid flow is $$\frac{W}{D\alpha} = \frac{N\cos\alpha}{N\sin\alpha} = 1/\tan\alpha \text{ (inviscid)}$$

The above description properly defines the planing condition. It follows that D and W/D are therefore trigonometric functions inherent in planing under Newton's second law, and are not dependent on local geometry in inviscid flow conditions.

Thus, inevitably, there is a maximum possible planing efficiency measured in weight-to-drag terms for inviscid planing. It is evaluated below, independently of fluid density, for two typical real efficient planing angles, 3° and 6°;

W/D @3°=1/tan 3°=19.08(inviscid)

W/D @6°=1/tan 6°=9.51(inviscid)

It is evident that the efficiency of inviscid planing tends to increase as the angle of attack decreases. Unfortunately, the presence of viscosity adds adverse complexity to the physics of planing, impeding that trend. As can be seen in FIG. 11, the added friction term is a function of the wetted length Lw (assume unit beam) of the flat plate, which necessarily increases if the angle of attack is decreased.

Thus, two opposing functions of the planing angle combine such that best efficiency for flat plates in real water occurs at angle of attack ill between 3° and 6°. In perfectly flat "water," the optimum weight-to-drag efficiency ratio is under 10. The addition of sea waves or wind driven "chop" lowers this ratio significantly.

When a real semi-planing boat is considered for ocean conditions, a Vee-type shape is necessary for structural reasons and comfort. Their maximum ratio of weight to drag is significantly less than 10, and close to 8 at speeds of the order of 40 knots in flat water. As mentioned earlier, this is approximately half the efficiency of a subsonic jet transport aircraft having a weight-to-drag ratio of 16 flying at 400 knots, i.e., ten times faster. The ratio 8 to 1 also compares adversely to a displacement hull which can typically have a weight-to-drag ratio of 40 at half the speed, i.e., at about 20 knots. The addition of ocean waves or chop to semi-planing hull reduces their poor efficiency in a marked way.

4. GENESIS OF THE TRANSONIC HULL AND ANTI-PLANING

This writer has considered the problems reviewed in sections 3 (displacement) and 4 (planing) for some time, firstly in theoretical studies of planing and displacement hulls while working as a Research Associate at Stanford University, and later on during his work for various America's Cup yacht programs (as Chief Aero-Hydrodynamist for the St. Francis Challenge, and then as Principal Designer for Team Dennis Conner). However, this writer, as an aerospace engineer, advanced his studies independently of yacht design rules, applying aerospace principles and methodology to the hydrodynamics of displacement hulls, based not on hull speed "laws" (which omit density and gravity terms), but on original Froude number which has gravitational and density terms.

Thus, within the broad objective of a breakthrough in drag-reduction to significantly improve the weight-to-drag efficiency index of ships, this writer sometime ago formulated new hydrodynamic fields for displacement hulls which, for theoretical reasons, he predicted to have no wave-making drag growth above hull speed. His preliminary experiments have indeed established that with this new type of field, the corresponding hull transcends, in a pure buoyant lift regime, the "hull speed" limit of displacement hulls with excellent efficiency below hull speed as well. This new development is considered as important in hydrodynamics as breaking the "speed barrier" was in aerodynamics. Hence, in a loose but interesting analogy (but also for disinformation), the new type of hydrodynamic field is denominated Transonic Hydrofield (TH), and the corresponding hull, or more properly, a family of hulls, has been denominated "transonic hull" (TH). The TH hulls also exhibit the capability of developing, in the displacement lift mode, important and unique propulsive hull pressures from the hydrofield, in a regime referred to as anti-planing, at speed ranges normally considered suitable for planing hulls, as will be described later on.

5. THE TRANSONIC HYDROFIELD & TRANSONIC HULL INVENTIVE SUBSTANCES

The reader is referred to the last statement of his conceptual inquiry in Section 2: "If one disregards all past hydrodynamic shapes and laws, is there a practical displacement hull shape that does not generate wave-making phenomena of the type that currently limits speed and economic performance of conventional displacement and planing hulls?" The answer is "yes": the Transonic Hydrofield (TH) and its corresponding Transonic Hull (TH).

It is important to clarify their inventive substance: TH pertains to a three-dimensional flow field capable of supporting a displacement translating hull without water surface alterations of the physical shape and energy consumption level of conventional displacement hulls. Thus TH is a unique three-dimensional flow field, which intrinsically imposes a consequent and corresponding submerged body form, the TH. This writer's invention process reverses the naval architect design process which is to first shape the body for minimal drag and other requirements, and then verify it by tests. The writer shapes the TH first, and then shapes the corresponding TH. Hence, both TH and TH are matter for claims of their invention. It is didactically preferable, however, to define first TH, and then review TH with the aid of TH.

6. OBJECTS OF INVENTION & ARCHETYPE CHARACTERISTICS 6.1 One Object & Archetype Characteristics: eliminate from the engaged dynamic waterplane all curves on the sides of the hull in the longitudinal direction. Without offering proof yet that such a shape can provide a displacement hull of useful purpose, it can be stated that as an immediate consequence, the real flow of the hydrofield cannot generate "shoulder wave," nor wave resulting from "forward curvature" as there is neither, nor a "midbody" wave, as there is no midbody inflection; and there will be no "quarter" wave, or wave resulting from "curvature aft" as there is no corresponding aft curvature. The physical solution to this historical impossibility is the archetype's engaged waterplane having the simple and elegant geometry sketched in FIG. 12a: a triangle.

Figure 12A:
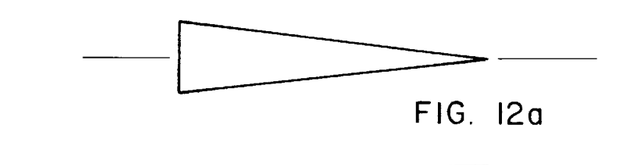

It is noted that this engaged waterplane archetype in FIG. 12a is, as yet, uncommitted as to underbody shape, stern hydrodynamics, propulsive power, control system, or, indeed, on how it can be a successful displacement hull at all.

But it is noted that the triangular waterplane, although successful in not having "shoulders", no "forward curvature" or no "midbody curvature", no "middle length system", no "quarter" and, no "curvature aft", retains a bow and inevitably some type of stern. Also, it needs displacement, while keeping in mind planing is not an objective. Obviously, further design is needed.

6.2 Another objective and archetype characteristic: a key point is that the summation of as yet undefined bow and stern waves has to be significantly different from the summation of waves of conventional hull shapes which have quarter and shoulder waves, and mid-body curvature effects, because it is the adverse sum of the various wave components which determine the magnitude of the critical trough near hull speed limit of a conventional displacement hull. This is the trough which causes hull sinkage near hull speed already discussed, and buries the forward and rear end of the boat into the typical bow and stern wave, aggravating the trough, et., and setting the hull speed physics. Objective 7a has clearly avoided the adverse summation of classical wave components, by eliminating some components. Is that sufficient?

This writer asks the reader to consider the effect of suppressing in the hydrodynamic situation of FIG. 3, by supreme edict of mathematical analysis if the reader allows, the waves associated with forward curvature (shoulder), midbody parallel sides, and aft (quarter) curvature of the body. This is at this time a virtual but illustrative graphic exercise, which, using FIG. 3 as a baseline, shows the interesting result of FIG. 3a. The estimated result is labeled "Est. AC1", a graphic wave summation of the Bernoulli, bow, and stern waves of a theoretical body without shoulders, midbody, or quarter. The result, though not necessarily a physical reality for TH (as will be reviewed later on), does alter the situation of FIG. 3. Is it sufficient?

Figure 3A:
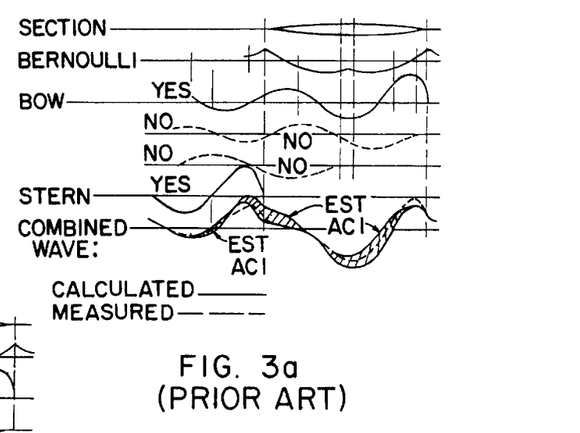

The cross-hatched areas in FIG. 3a show a substantial reduction of mid-body trough, which should decrease (but not eliminate) wave-making drag rise with increasing Froude number for ships in general. However, the exercise of FIG. 3a increases the stern wave, not desired "per se" in the TH. This leads to a second virtual exercise: the elimination, by supreme edict, of the stern wave, as estimated by the wave summation of FIG. 13b. The result, unfortunately, does not eliminate the trough. It only reduces it. Thus, 7(b) is qualified as a desirable but insufficient characteristic. More thinking is needed.

Figures 12B, 15A:
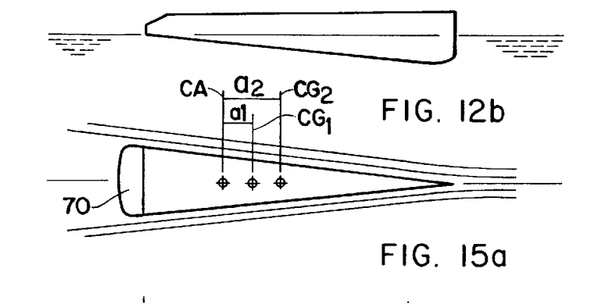

6.3 Another objective and TH characteristic: Unfortunately, nature does not bend to the wishes of inventors. This writer has to contend to the underwater three-dimensional shape corresponding to the triangular archetype hydrofield waterplane of FIG. 12a, for it to achieve displacement and eliminate stern wave. If the underbody near the stern were curved as in conventional yachts, this writer's hull would exhibit a tendency towards "wave-making," and "sinkage." To prevent these disorders and for fundamental reasons of mathematical hydrofield formulation, another TH archetype characteristic is formulated: the underbody in profile is a straight line defining, together with the waterplane, a triangular profile with its base at the bow, as shown in FIG. 12b. Note that the base of the waterplane is at the stern, forming a unique orthogonal imbrication of complementary triangular shapes and corresponding volumes, the geometric name of which is not recognizable and is denominated for convenience "double wedge."

It is a unique property of the archetype underbody shape of FIG. 12a and 12b that the pressure integral of its underbody surface, shown in FIG. 13a, responds in hydrofield conditions to a negative angle β, relative to the horizon, with no undersurface area at positive β. Thus, the resultant pressure force N necessarily provides a propulsive thrust equal to $-N \sin \beta$. This is referred hereafter as the anti-planing propulsive condition of a displacement TH. This is in direct opposition to the pressure drag term $N \sin$ discussed already for planing in FIG. 11.

Figures 13B, 13C, 15B, 15C, 15D:
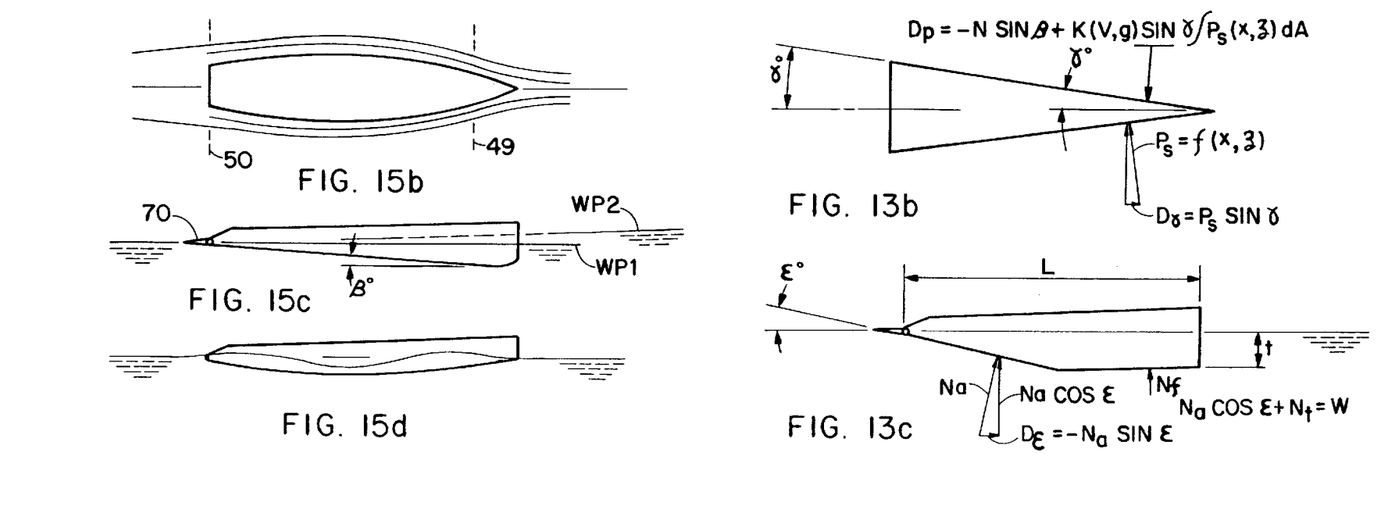

In FIG. 13b there is shown a drag force from the integral of the lateral forces on the hull's side area from element da, integrated symbolically in FIG. 13b as drag Dγ, where γ is half the angle at the apex of the hydrofield's waterplane triangle. This drag effect can be made small by designing a sharp entry, and by other means, to be reviewed later on.

What is of extreme interest is the form of the total pressure drag D equation implicit in FIGS. 13a and 13b, as follows:

$$D = -N \sin \beta + K(VG) \sin \gamma \int P_S (x, y, z) da$$

Where K is function of velocity V and gravitational force G The $-N \sin \beta$ term is propulsive, and the second term which includes the side pressure term $P_S$ in the integral can be made small by choosing a small value of angle γ, and by other means to be described later on, pertaining to a trailing flap at the stem of TH, and/or unique combination of propulsive flows with the hull's hydrodynamics.

Figure 3B:
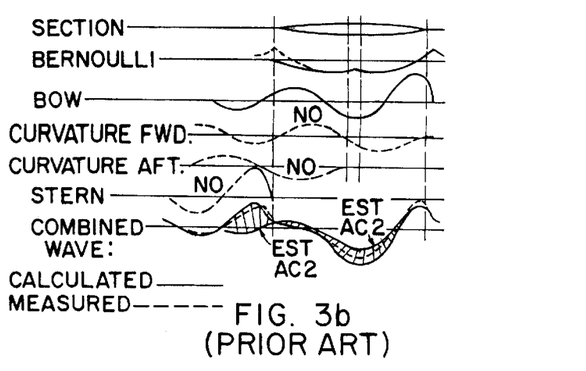

6.4 Another objective and TH characteristic: A critically important requirement of the triangular archetype of FIG. 12b is the very sharp entry angle of the body in the hydrofield. This is achieved by setting maximum beam substantially at the hull's stern, instead of somewhat ahead of the stem, nearer the middle, as is usual. This results in reducing the entry angle by about half. As mentioned, this sharp entry reduces the pressure drag on the sides, as described in FIG. 13b. Equally important for the hydrofield, it reduces the volume of near-surface water displaced in the bow region per unit time at a given speed, thus reducing the tendency for bow wave (see FIGS. 3, 3a, 3b), although the classical concept of bow wave does not apply in the traditional sense to TH, as will be explained later on.

Additionally, the placement of maximum beam at stern has its own large beam buoyant lift contribution compensating its small local draft and, in addition, a hydrofield lift and propulsion capability, each of which prevents the formation of a stern wave and opposes a pitch up, otherwise causing drag due to angle of attack, i.e., retains the TH in TH out of the planing mode. Although wide stern aids in the extraction of energy from a following sea overtaking the hull, more important, it is an energy recovery feature of TH's three-dimensional hydrofield, acting on TH's stern design.

6.5 Another objective and TH characteristic. Although elegant, the geometric archetype TH does not exist to please the human eye. Rather, it corresponds to the real inventive substance of TH, which is a three-dimensional hydrofield archetype that does not generate wave-making drag at its design speed envelope. TH's inventive substance is better explained by steps with the aid of isometric figures.

Figures 14A, 14B, 14C, 14D, 14L, 14M, 14N:
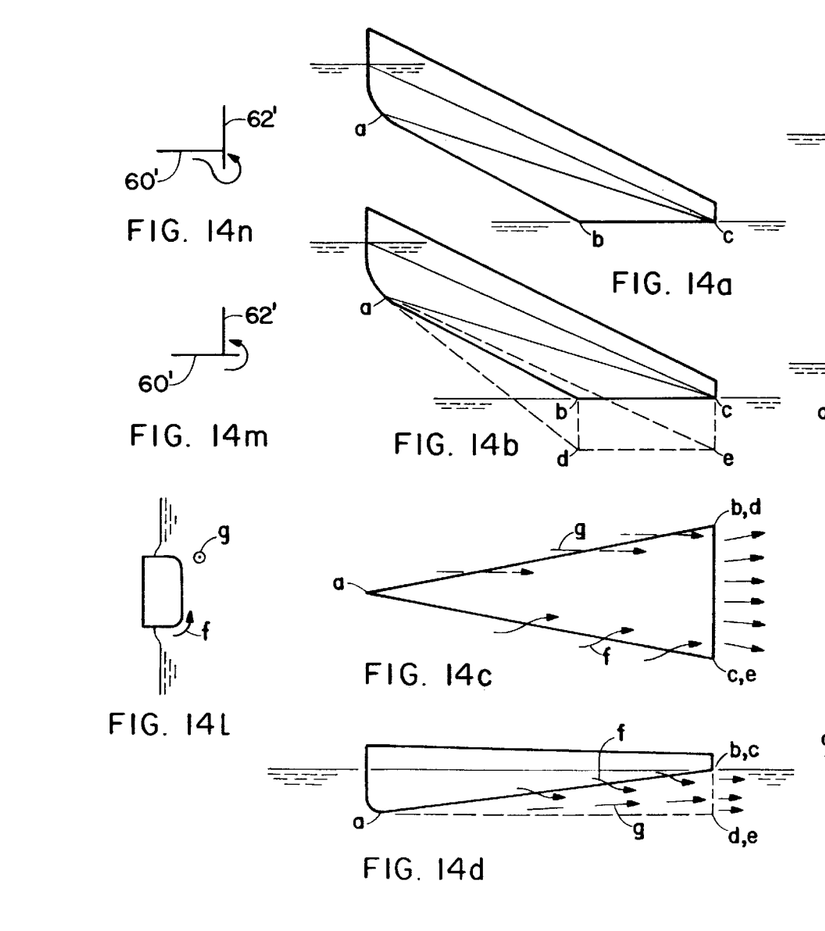

FIG. 14a shows as a starting case the TH hull having an undersurface triangular plane a, b, c, with the corresponding nearby waterplanes indicated.

FIG. 14b adds on the undersurface a complementary imaginary pyramidal flow control volume having corners a, b, c, d and e. This control volume permits to raise the very interesting question: how can the flow rate leaving the control volume perpendicular to base rectangle b, c, d, e exist?

Mathematically, such flow rate must pierce lateral triangles a, c, e and a, b, d. FIG. 14c and 14d illustrate the piercing and exiting flows corresponding to a continuity equations to the previously defined control volume. Referring first to the flow indicated on the left flower side of undersurface of FIG. 14c, it is seen that continuity adjacent the left corner of the hull requires an inward local flow adjacent to the hull's submerged corner, exemplified by curled flow vectors f (non-scale), rather than the usual outward flow (the inward curl has an alternate solution described later). The unique benefit is that such local flow tends to decrease the height of the water on the sides of the translating double-wedge displaced volume of TH, as is evident on the left side of FIG. 14e (non-scale). By this special hydrodynamic effect, denominated anti-wave subduction, is the displaced volume per unit time caused by motion of TH is induced to flow, to a large extent, below TH's bottom, rather than appearing as surface waves. The inventive complementary consequence is exemplified at a rear lower level of the control volume: the remote flow pierces the lower sides of the control volume undisturbed, as exemplified on the right (upper) side of FIG. 14c, by straight vector g, also shown on the right of FIG. 14e.

Under anti-wave subduction, the inward lateral flow below TH's undersurface is hydrodynamically directed, by continuity, to exit as a high energy content wake. Because it is high energy, there is low vehicle drag. The flow combination thus described under a mathematical study by means of the submerged control volume of FIG. 14b according to the assumptions of FIGS. 14c, d, and e, promises that there should be no stern wave to TH of any kind, and moreover that at certain speed range the drag growth with speed growth should be a function of the square of speed gain only, i.e., no wave-making drag growth even though TH is a submerged displacement body with a bow and stem. The mathematical situation, however, requires The inclusion of the wake behind the stern, as reviewed below.

Figures 14E, 14F, 14M:
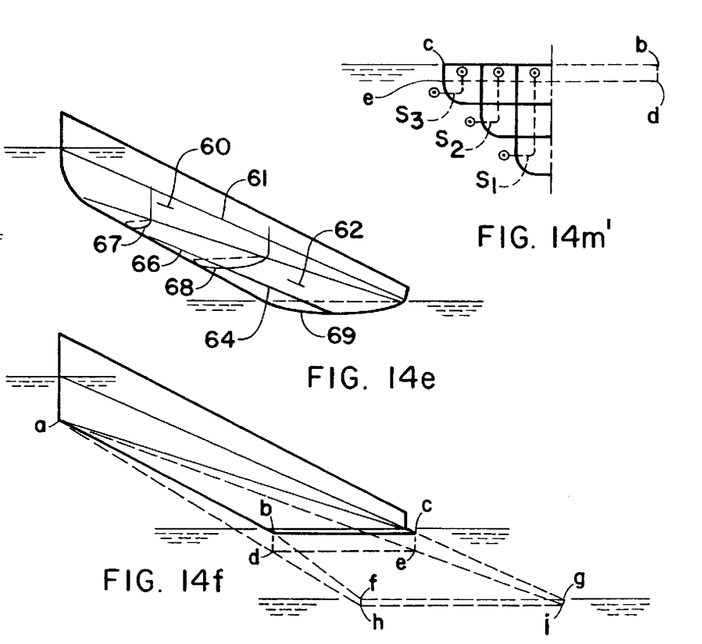

FIG. 14f shows two submerged control volumes interconnected at a vertical rectangle below the transom of a TH hull, which is equipped with a small trailing flap so that the flow exits from the font volume to rear volume through the interface rectangle, vertical to the remote waterplane.

Specifically, FIG. 14f shows a shallow forward submerged control volume pyramid a, b, c, d, e below the undersurface of TH having lateral sides a, c, e and a, b, d, with a rectangular vertical base below the stem b, c, d, e. With the flow streams parallel to approximately horizontal planes a, b, c and a, d, e, the following equation of continuity can be written with the definitions of FIG. 14g.

Let γ equal half the hydrofield's waterplane apex angle.

Let V equal boat speed.

The average flow vector component entering each side of the forward control volume must be V sin, perpendicular to the sides a, c, e and a, b, d.

The average flow vector component exiting perpendicular to the rectangular base b, c, d, e below transom is $V_T$.

Figure 14G:
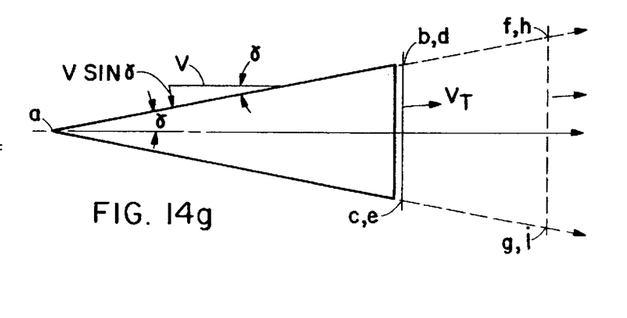

Consequently, the continuity equation for the submerged forward control volume is of the form $$V \sin \epsilon ac \times ce = V_T cb \times ce \qquad (1)$$

The above equation implies certain momentum distribution of the submerged hydrofield, which enters at the vertical face of TH's rearward submerged wake control volume, idealized for mathematical convenience extending between vertical rectangle b, c, d, e below the transom as a plane of momentum entry, and exits at vertical rectangle f, g, h, i, at considerable length downstream.

The writer now assigns continuity condition within the rear control volume, noting that the sides b, d, f, h and c, e, g, i are coplanar with the sides of TH's hull. This imposes a continuously expanding flat surfaced submerged TH wake 32 shown in FIG. 14h, rather than the usually contracting wake seen to the rear of semi-planing boats, such as 57 in FIG. 14k, and without the "traverse" surface wave, such as 49 and 50, at the stern of displacement boats such as in FIG. 14j.

With the previous transonic hydrofield requirement, as in FIG. 14f and 14g, we have imposed that the flow thus enveloped is parallel to top and bottom planes of the rear control volume. Accordingly, we can write a continuity equation for the rearward control volume as follows:

$$V_W gf \times gh = V_T cb \times ce \qquad (2)$$

where $V_W$ is an average wake velocity perpendicular to the downstream vertical rectangle.

From equations (1) and (2) we can establish, for the idealized three-dimensional hydrofield, a relation between remote wake velocity and boat velocity as follows:

$$V \sin ac \times ce = V_W gf \times gh \qquad (3)$$

6.6. Speed Envelope of TH and TH. It is possible to solve several local flow velocities from equations (1), (2) and (3). The estimated corresponding hydrofield for TH have two types of quasi-steady solutions, subcritical and supercritical.

6.6.1 Supercritical Regime. The SUPERCRITICAL is a preferred hydrodynamic design condition for the submerged transonic hydrofield. It permits the general outlook of FIGS. 14f and 14g and has the surface appearance of FIG. 14h, noting that the upper surface of the rearward control volume is at the air-water constant pressure interface. TH has exception performance.

Figure 14H:
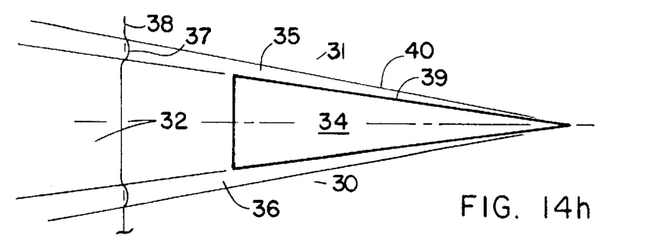

Specifically in FIG. 14h, the surface flow field is flat and equipotential in the gravitational sense in zones 30, 31 and 32. While region 32 is flat, it includes molecular agitation, because of friction below undersurface 34 of TH. Nevertheless, region 32 continues to expand in a unique way, because of its highly directional steady momentum, indicative of successful anti-wave subduction for optimum performance of TH.

The volume displaced by translating TH emerges principally in region 32, With the minimal surface alteration appearing as left and right three-dimensional rays 35 and 36, having the minimal elevation shown by hump 37 at downstream wake cut 38, and minimal hump 39 at midbody station 40. The minimal humps are better understood from the teachings of FIG. 14e regarding anti-wave subduction. This type of surface flow field applies to the TH's design speed range (above classical hull speed) in which the unique properties of the 3-D TH flow field has the unique feature for displacement hull: increase of drag with speed to only the second power of velocity, i.e., no added wave-making with added speed: This is the super-critical TH regime for TH, and contrasts with drag growth of conventional displacements hulls which can vary with 3rd power and up to 7th power of speed.

Certain supercritical hydrofield solutions of continuity is exemplified in FIG. 14m. The corresponding TH archetype geometric sections are shown as seen from the rear. The inward flow induced by the double-wedge three-dimensional geometry is shown as dashed streamlines S1, S2, S3, each with a constant-elevation inward flow before they initiate their sloped rearward accent along the underbody of TH, entering the left half of rearward control volume at left half of rectangle c, b, d, e.

6.6.2 Subcritical Regime. In the SUBCRITICAL speed regime, shown in FIG. 14i, surface flow fields of TH are flat and equipotential in regions 41, 42 and 43. But undersurface viscosity forces, relative to momentum content of flow at subcritical speeds limits the shape and area of the wake to a gothic arch type of platform such as 43. Rays 44 and 45 have larger humps. Downstream of flat wake 43, there is some eddy and hump formations 46 and 47 and a central hump 48. In this sub-critical regime, there may be in some cases drag growth with speed slightly higher than second power of speed, because of the eddies and elevations, even though there are no transverse stern wave nor traverse bow wave of the type of conventional displacement hulls, such as crests 49 and 50 of FIG. 14j, nor is there a divergent wave 51, all of which correspond to smooth displacement hull 51 at its hull speed.

6.7 Comparison of Wakes of Various Hulls and TH. When a displacement hull such as 51 is lightly loaded and moving at speeds considerably higher than hull speed, its wake forms long longitudinal humps and troughs such as 52 and 53 respectively, causing a much higher energy consumption than TH in its supercritical TH condition of FIG. 14h.

As the design speed envelope of TH is considerably above that of conventional displacement hulls, it is interesting to compare the surface conditions of supercritical TH flow and planing flow.

Figure 14I:
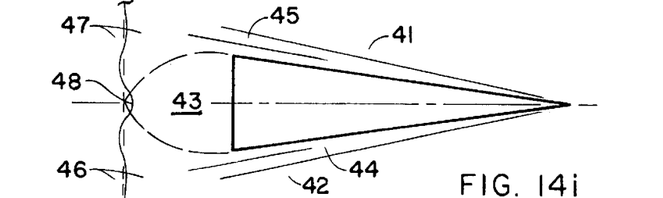
Figure 14J:
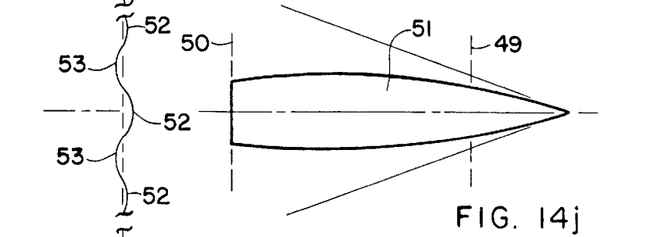
Figure 14K:
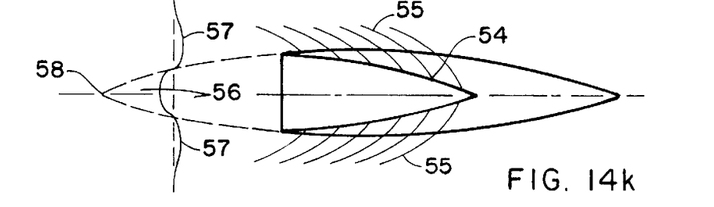

FIG. 14k shows the wetted platform 54 of planing hull at a positive planing angle reviewed in FIG. 11 throwing lateral water sheets 55 and generating at the Vee-transom a hollow wake 56 around which there is high turbulent wake which closes at 58.

A comparison of the non-planing TH subcritical surface flow of FIG. 14i and supercritical flow in FIG. 14h indicate how TH has much less drag than planing or displacement.

The comparison of FIGS. 14h to 14k have been make at equal length, maximum beam, and assumed weight. The efficiency index weight-to-drag of TH is vastly superior at speeds of supercritical flow, and significantly superior at subcritical speeds.

6.8. Additional Characteristics of TH. The double-wedge submerged shape of TH provides buoyancy lift and eliminates wave-making resistance in the displacement mode. In FIG. 14e, sides 60 should be steeply inclined or vertical in its submerged area and somewhat above the hydrofield's waterplane, to interact with water displaced under motion with TH's fine bow, which adds water volume in the proximity of the hull's midbody and aft body, with rays 35 in FIG. 14h, rather than forming a midbody or aft body trough of conventional hulls, even if mildly curved at high speeds, as shown in FIG. 15d.

It should be understood, in connection to the discussion of FIG. 15c, that the pressure integral over its wetted underbody prevents, with maximum beam at stern, the pitch up of a displacement hull. This, together with the side effects of the double-wedge, uniquely captures any energy otherwise leading to a stem wave, and what is critical, by choosing a large angle of exit β, for example 10° or more, there is achieved a gain of propulsive pressure force and of displacement adequacy For such cases, a trailing flap on the stern at the waterplane's base is provided, because with its maximum beam, it provides maximum recovery of underbody flow energy towards positive heave and nose-down pitch, which can aid propulsive pressures in special combination, as shown by flap 70 in FIGS. 15a and 15c.

It should be further understood, in respect to the triangular hydrofield waterplane of FIG. 14b with near vertical sides that by generating a linearly increasing water beam from bow to stern, there results contracting and stable streamlines without eddies in the entire length of the sides of the hull, as shown in FIG. 15a, without the usual inward curvature of streamlines near a conventional stern as in FIG. 15b, which has the corresponding eddy sources and classical wave-making profiles shown in FIG. 15d. The steady flow of 15a favors low viscous drag, including smooth wake conditions aft of the stem.

It is further noted from FIG. 15c that when TH is in motion, the hydrostatic pressure on the TH's undersurface decreases as the flow moves rearward along the entire underbody at a negative angle β, which favors by means of a continuous favorable gravitational pressure gradient, low friction drag, more effective when β is of the order of 10° or more. However, underbody slope discontinuity can also be accepted in certain cases; for example, for meeting displacement for cargo requirements, as shown in FIG. 13c. Although the underbody area providing propulsive pressures is smaller, the exit angle ε is much larger than β in FIG. 15c, and the effective propulsive thrust may be even larger in FIG. 13c, provided the flow remains attached.

There is another special characteristic of TH which is its ability to change its altitude nose up with increasing speed up to an angle equal to β, without incurring in drag due to angle of attack, obtaining the benefit of reduced wetted area on the hull's sides, of significance at the higher speed range. Change of trim can be induced by the hydrofield itself, by the flap, by change of fuel position, or by auxiliary surfaces.

Another characteristic of TH and TH is the absence of suction forces from usual longitudinal curvature in profile on the hull in the displacement mode, which prevents added apparent weight usual in displacement hulls. Therefore, TH has less drag.

6.9. The TH and Viscous Effects. The previous figures have described the archetypes TH (geometry of hull) and TH (three-dimensional hydrofield principally in respect to elimination of wave-making drag. However, vessels have also friction drag, lateral stability requirements, fabrication process, etc. These impose certain requirements to TH which are acceptable for TH.

FIG. 14l addresses the need to reduce wetted area for a given displacement, and avoiding excessive local speeds with sharp curvatures. Specifically, a TH having vertical side surfaces such as 61 in FIG. 14l, and TH's undersurface 62, may have sectional shapes as follows:

At the forward station, a U-shape with the lower portion deeply submerged arc being circular or quasi-circular.

At midbody station 68, the cross-section of the deeper submerged portion is elliptical, or quasi-elliptical.

At stern station 69, the cross-section of the submerged portion is flattened elliptic, or flattened quasi-elliptical.

The circle to ellipse family mentioned above is convenient, because of its relative mathematical simplicity in smooth transition, both being from the conic family. However, TH operates not in conic space, but in a gravitational field. According to this writer's study, there are better curves identified below:

A catenary section is gravitationally derived and is well suited. However, the forward vertical axis needs rotation reaching the stern.

Another shape for section of TH is the hyperbolic spiral with the corresponding Cartesian axis being rotated gradually, reaching at the stern with rotation and inversion.

Finally, if a conic family is used, because of its simplicity, a double longitudinal axis should be considered with a vee-relation between axis meeting near the forward end of TH.

In profile, body of TH in FIG. 14l can have a lower surface element 66 which when parallel to water surface, towards maximum volume for a given wetted area, has an upwardly inclined section 64 between stations 68 and 69 (see also FIG. 13c).

6.10 TH and Form Stability. It is important in respect to the waterplane of FIG. 12—hydrostatic and hydrofield—and TH shape of FIG. 14l, to understand its unique features relative to lateral stability. This is done by comparing certain features of TH to two archetypes of conventional ships, all of equal maximum beam and overall length, as follows.

Figure 16A:
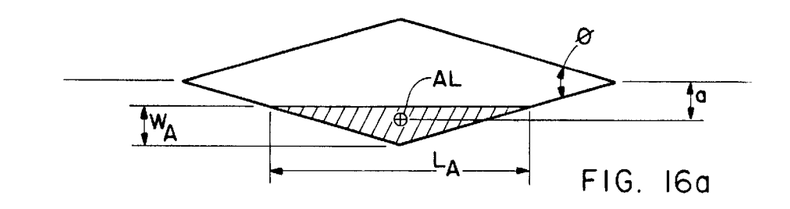

FIG. 16a shows a diamond waterplane archetype, which could be considered to have great lateral or form stability. This is attained an obviously large wave-making, from its midbody "curvature" and from a large entry angle of the bow.

Figure 16B:
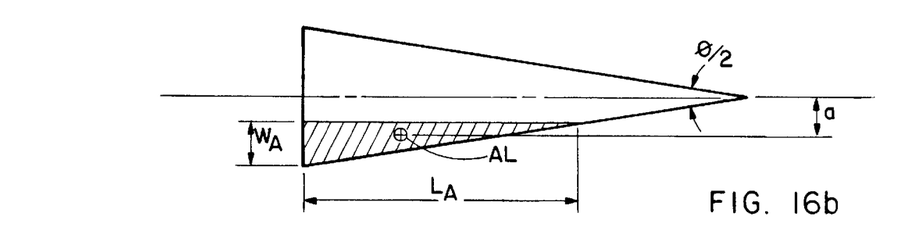

FIG. 16b shows my DISCOVERY that the TH's triangular planform, although it has the intended half entry angle compared to FIG. 16a and no lateral wave-making sources, has equal lateral stability. This is shown by comparing the equal lateral planform area segments AL of FIGS. 16a and 16b, which have equal moment arms to the respective centerline.

6.11. TH, Logitudinal Trim and Pitch Stability. A unique feature of TH in TH is the inherent ability to trim by the bow. In this procedure, bow draft increases with increasing weight (cargo) while keeping near fixed draft at the stern, as shown in FIG. 15c with waterplane WP1 and WP2, a special feature for low drag.

Another unique feature of TH is the inherent decoupling of the longitudinal position of its buoyancy center (LCB) from the longitudinal position of its waterplane centroid, thus decoupling the center of gravity of the boat in respect to the area centroid CA of the waterplane shape, as shown in FIG. 15a, with a large "arm" a1 or a2, not feasible for conventional hulls. This decoupling damps out pitch motion in a rough sea, improving comfort and performance, also of interest for the aerodynamics of sails and hydrodynamics of hulls of sailboats in a choppy or heavy sea.

Moreover, it is a unique characteristic of TH that for a given CG, attitude remains constant for a large range of speed, holding the same negative angle β.

6.12 Remarks on TH and TH. Although the transonic hydrofield does not respond to conventional parameters of conventional hulls, such as speed-to-length ratio (speed in knots divided by square root of boat length in feet) according to which hull speed is 1.35, nor does it respond to displacement-to-length ratio (displacement in "tons" divided by to third power of quantity hull length in feet divided by 100), nor maximum draft-to-length ratio, nor to ratio of boat length to maximum beam; the corresponding naval calculations can be made for TH nonetheless, to (a) permit comparisons of test results of TH with conventional hulls, and to (b) delineate properties and weights for TH vessels in which the unique benefits of TH excel, by way of example and not of limitation. For example:

By placing maximum beam at stern, L/Bmax as low as 4.3 can be used, keeping a total entry angle (side to side) of 6.5°, which means approximately half that of a refined conventional displacement boat with fine entry.

By using a large ratio of draft to length, of the order of 0.1 or more, large payloads can be carried in displacement modes retaining supercritical and subcritical flows.

By using low length-to-beam ratio, lateral from stability is retained with maximum beam adjacent the stern for fine bow entry.

By using a large deep draft-to-length ratio, exceptionally low drag can be attained with ratio of displacement-to-length displacement in tons well above 100 and exceeding 200.

It is pertinent also to clarify certain qualitative differences between TH and prior art. For example, TH as in FIG. 14*h* and the planing hull as in FIG. 14*k* can be regarded to have similar waterplanes. The fundamental and qualitative difference is that for TH triangular planform 34 is at a negative angle to water surface providing a propulsive force as in FIG. 13*a* or 13*c* in the displacement buoyant lift regime, whereas quasi-triangular water planform 54 in FIG. 14*k* generates a drag force as in FIG. 11 in the planing dynamic lift regime. These are totally different and opposite regimes.

The specifications, claim substance, and drawings pertaining to TH and T̲H̲ described in the preceding pages of this document pertain to hydrodynamics, to corresponding archetype bodies, and to hydrodynamic methods. The inventor recommends that the dynamics of TH and T̲H̲ are investigated by a licensed manufacturer of a TH in full size. This results must establish the necessary improvement for achieving seaworthiness and safety of TH. Small scale testing of models is not sufficient for safe, full size commercial application of TH. Moreover, the structural integrity, mechanical reliability, adequacy of boat control seaworthiness, and any other specific design and safety factor that affects any specific boat that could be built in relation to the patent are obvious not covered by this document, and is the sole responsibility of the engineers, naval architects, marine organizations, etc. which undertake TH fabrication, and its users. Accordingly, licenses and/or purchasers of the patent are obligated to assume all responsibility and liability of the TH vehicles and to advise the clients of this fact.

Within the general archetype and preferred shapes of TH and T̲H̲ described above, this writer's design can be varied with unique refinement and special features needed for concrete practical applications, without departing from the spirit of the invention.

I claim:

1. A transonic hull portion having a bow, a stern, and a length, a substantially triangular waterplane, side surfaces extending from said bow to outboard edges of said stern with a deep draft forward and a shallow draft to the rear, said hull portion being immersed in a water body in a displacement mode having a remote reference water level and a supercritical transonic three-dimensional hydrofield in direct contact with and translating and supporting by means of buoyant forces, the submerged surfaces of said transonic hull portion translating at high speed in said water body in said displacement mode, said hydrofield being further characterized in having (a) a substantially triangular planform at water level with substantially rectilinear longitudinal sides with the base of said triangular planform corresponding to the stern of said hull portion and the pointed end forward; (b) lateral hydrodynamic rays of small elevation and narrow width in cross-section extending along said sides of said planform; continuing downstream of said base of said hydrofield as generally straight rearward extensions of said rays; (d) with a generally flat wake extending downstream from said base of said planform, said generally flat wake being contained between the portion of said rays located to the rear of said base, and having a water level therebetween substantially equal to that of said remote waterplane outboard of said rays.

2. A transonic hull portion according to claim 1 in which the traverse distance of said flat wake downstream of said base continues to increase linearly with increasing distance aft of said stern.

3. A transonic hull portion according to claim 1 in which the hydrofield surfaces corresponding to and supporting said submerged transonic hull portion forward of said stern between said hydrodynamic rays is depressed below said reference waterplane, with said depression having a deep draft forward with a narrow entry angle, and a shallow draft adjacent said stern, thereby establishing the depressed region of said hydrofield which corresponds to said submerged transonic hull portion.

4. A transonic hull portion according to claim 3 in which the cross-sectional shape of said depressed hydrofield corresponding to the immersed surface portion of said hull portion has substantially vertical principal water side surface portions adjacent and below said hydrodynamic rays along the principal length and depth of said depressed region.

5. A transonic hull portion according to claim 4 in which the lower portion of said principal water side surface portions are connected in the transverse direction by a bottom water surface, having a substantial portion of its area being generally flat and horizontal in a traverse direction.

6. A transonic hull portion according to claim 1 in which the ratio of said high speed expressed in knots to the square root of said length expressed in feet is greater than 1.25.

7. A transonic hull portion according to claim 5 in which the water flow direction in said hydrofield flows inwards and downwards below the lower limits of said water side surface portions, with said principal flow progressing rearwardly along said bottom water surface, said bottom water surface being upwardly inclined in side view at shallow angle, said flow emerging into said flat wake aft of said base and between said hydrodynamic ray extensions at generally the same elevation as that of the remote water level.

8. A transonic hull portion according to claim 1 in which said sides of said water planform adjacent said forward pointed end form an angle no greater than approximately 14°.

9. A transonic hull capable of operating at high speed in a displacement mode characterized in having a submerged displacement volume which projected in planform has a substantially triangular shape at the waterplane having an apex at its bow and a base adjacent its stern, with the left and right sides of said waterplane being substantially rectilinear over substantially the principal length of said waterplane, with said submerged volume having right and left sides which are approximately triangular in a side view with a base forward establishing a deep draft adjacent said bow and an apex at a shallow draft adjacent said stern.

10. The hull of claim 9 in which the underbody surface of said transonic hull in its principal length is inclined at a small negative angle to the water surface, said underbody surface having a substantial portion of its area generally flat and horizontal in the traverse direction, and a rear edge exiting substantially at at a dynamic waterplane level, with the pressure of buoyant forces on said generally flat portions of said underbody surface being generated by smooth hydrodynamic flow along said underbody surface, said pressure forces having a propulsive force component pushing said transonic hull forward, whereby the ratio of vehicle weight to pressure drag is improved.

11. The hull structure of claim 10 adapted to operate in waters of limited depth with said underbody surface having a modified forward portion of limited draft and area approximately parallel to water surface, and a rearward portion of much greater area than the area of said forward portion inclined to the water surface at a significant negative angle, larger than said small negative angle, with the propulsive pressure force component in the rearward portion being increased in proportion to the increase of negative angle, and with the draft of the forward portion being less than said limited water depth, as required for practical use of said hull in said water.

12. A transonic hull having anti-wavemaking subduction and anti-planing propulsion when in displacement regime at high speed, characterized in having generally flat sides along the principal length of said hull with substantially no twist below its waterplane and inclined at a very steep angle to said waterplane throughout substantially a principal length of the hull, with the planform of the corresponding waterplane being substantially triangular on a principal length of said hull, with substantially rectilinear sides over said principal length, with the base of said triangle adjacent the stern, and an undersurface having its forward end with a deep draft substantially deeper than the draft at said stern.

13. The structure of claim 12, in which the submerged portion of said hull facing downwards has cross-sectional shapes including approximately elliptic portions, with major axes vertical near the front, and major axes horizontal adjacent the stern, said cross-section being further in that the side surface portions adjacent the waterplane from midbody towards the rear are substantially vertical, and the corresponding downward facing surfaces include approximately flattened elliptical portions in traverse cross-section adjacent said stern.

14. Claim 9 in which the speed-to-length ratio of said hull is greater than 1.25 in displacement mode, with speed expressed in knots and the denominator of the ratio expressed in square root of length in feet.

15. Claim 9 in which said hull has a movable adjustable stern flap, which in operational mode makes a small positive angle relative to the hull's negatively inclined undersurface adjacent the hull's stern, establishing propulsive momentum redirection from undersurface flow.

16. A transonic hull having a submerged portion with a sharp bow, a wide stern, and a length at waterplane level there-between, said hull portion being further characterized in having:

(a) A substantially triangular planform at waterplane with two substantially rectilinear sides extending over a principal length of said waterplane connecting said sharp bow with the outboard ends of said stern at waterplane at the horizontal base of said triangular planform;

(b) A submerged substantially triangular profile projected in a central vertical plane with the base of said triangle adjacent said bow engaging a deep draft and its apex adjacent said stern;

(c) A lower surface having substantially rectilinear longitudinal elements over the principal length of said lower surface; and (d) side surfaces on said submerged portion with substantially no twist over their principal length.

17. The structure of claim 16 in which said submerged portion has transverse cross-sections with principal elements on said side surface and said lower surface with approximately rectangular relationship, said relationship extending between a region adjacent said stern and a region adjacent said bow.

18. The structure of claim 17 in which the envelope of said cross-sections having rectangular relations defense, in end view, a substantially triangular envelope shape, with its apex downwards and its base adjacent the waterplane.

19. The hull of claim 9, inherently characterized in having a longitudinal position of the center of area of the waterplane significantly to the rear of the hull's center of gravity including the hull's payload, whereby damping in pitch in adverse sea conditions is greatly enhanced.

20. The hull of claim 9 in which the ratio of said deep draft to the longitudinal distance between said bow and said stern is no greater than approximately 0.8, whereby operations of high speed of said hull in open ocean is made compatible with operations of said based hull within waters of limited depth.

21. The hull of claim 9 further characterized in that each cross-section in the transverse direction upstream of midbody is characterized in having a beam distribution in a vertical direction below the waterplane that is approximately constant over the principal depth of the cross-section above its lower corners, with the cross-area distribution and volume distribution of upstream of said midbody of said hull being deeply submerged, whereby the formation of bow waves is minimized.

22. The hull of claim 12 in which the beam distribution above said waterplane level remains generally equal to that below said waterplane.

23. The hull of claim 12 in which the beam distribution characteristics at each section extends along the principal length of said hull.

24. The hull of claim 19, further characterized in that the longitudinal distance between said center of area and the hull's center of gravity can be decreased by moving said payload rearwards thereby engaging a small incremental draft at said stern without shifting said center of area.

* * * * *